United States Patent [19]

Northmore

[11] Patent Number: 4,515,455
[45] Date of Patent: May 7, 1985

[54] CAMERA MOVEMENT SYNCHRONIZING APPARATUS

[76] Inventor: James E. Northmore, 28207 Grand Duke Dr., Farmington Hills, Mich. 48018

[21] Appl. No.: 481,729

[22] Filed: Apr. 4, 1983

[51] Int. Cl.³ .............................................. G03B 15/00
[52] U.S. Cl. ..................... 354/293; 354/81; 352/243; 248/647
[58] Field of Search ............. 354/80, 81, 293; 352/89, 243, 44, 53, 85; 358/93, 125, 108; 248/647; 355/52

[56] References Cited

U.S. PATENT DOCUMENTS

| | | | |
|---|---|---|---|
| 2,599,624 | 6/1952 | Gillette | 352/89 |
| 2,962,547 | 11/1960 | Douglas | 352/53 |
| 3,226,476 | 12/1965 | Tyler | 358/108 |
| 3,598,355 | 8/1971 | English | 354/293 |
| 4,283,766 | 8/1981 | Snyder et al. | 352/53 |
| 4,348,097 | 9/1982 | Sippel | 354/293 |

FOREIGN PATENT DOCUMENTS 2103815A 2/1983 United Kingdom ............... 354/293

Primary Examiner—A. A. Mathews
Attorney, Agent, or Firm—Basile, Weintraub & Hanlon

[57] ABSTRACT

An apparatus for synchronizing movement of a camera with movement of an object to be photographed. The synchronizing apparatus includes a horizontal track which is disposed parallel to the path of movement of the object. A planar platform is movably mounted on the track and supports the camera. First and second pulleys are respectively aligned with the path of movement of the object and the track. An interconnecting cable is connected to the object and to the platform and passes around the first and second pulleys for causing an identical and simultaneous movement of the camera with movement of the object. In another embodiment, hydraulic cylinders and pistons are mounted on the dolly and the object and are connected in fluid flow communication for simultaneous movement in the same direction.

2 Claims, 4 Drawing Figures 014,515,455

CAMERA MOVEMENT SYNCHRONIZING APPARATUS

BACKGROUND OF THE INVENTION

1. Field of the Invention

This invention relates, in general, to photographic devices and, more specifically, to photographic devices for synchronizing the movement of a camera with movement of an object.

2. Description of the Prior Art

In taking photographs or motion pictures of a moving object, it is often times necessary to continuously move the camera in conjunction with movement of the object in order to obtain the best results. Typically, the camera is mounted on a dolly which moves along a horizontal track so as to move in conjunction with movement of the object or to pan across one side of a stationary object.

While such camera movement devices enable high quality photographs to be taken of moving objects, the precise movement of the camera is not coordinated with movement of the object but is under the control of the camera operator. This is a particular problem when taking still photographs of a moving object. In order to obtain the best photographs which require little or no retouching, it is necessary to move the camera at the same rate of speed and in the same direction as the movement of the object. Heretofore, there has existed no effective means for synchronizing such camera movement with movement of an object.

SUMMARY OF THE INVENTION

The present invention comprises an apparatus for synchronizing the movement of a camera with the movement of an object to be photographed. The synchronizing apparatus includes a horizontal track which is disposed parallel to the path of movement of the object. A camera mounting means which supports the camera is movably disposed on the track for bi-directional movement.

A first pulley is mounted in line with the path of movement of the object. A second pulley is mounted in line with the horizontal track. An interconnecting means, such as a cable, is connected between the camera mounting means and the object and extends around the first and second pulleys such that movement of the object in a first direction causes a simultaneous and identical movement of the camera mounting means in the same direction and at the same rate of speed as the object.

In a preferred embodiment, the track comprises a pair of spaced, parallel guide rails. The guide rails are in the form of tubular rods which are covered with a coating of polyethylene to provide a smooth, low friction surface which prevents any binding of the camera mounting means as it moves along the guide rails.

The camera movement synchronizing apparatus of the present invention overcomes many of the problems encountered with previously devised camera movement devices in that the movement of the camera is perfectly synchronized with the movement of an object to be photographed. In this manner, high quality still photographs can be obtained which require little or no retouching.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
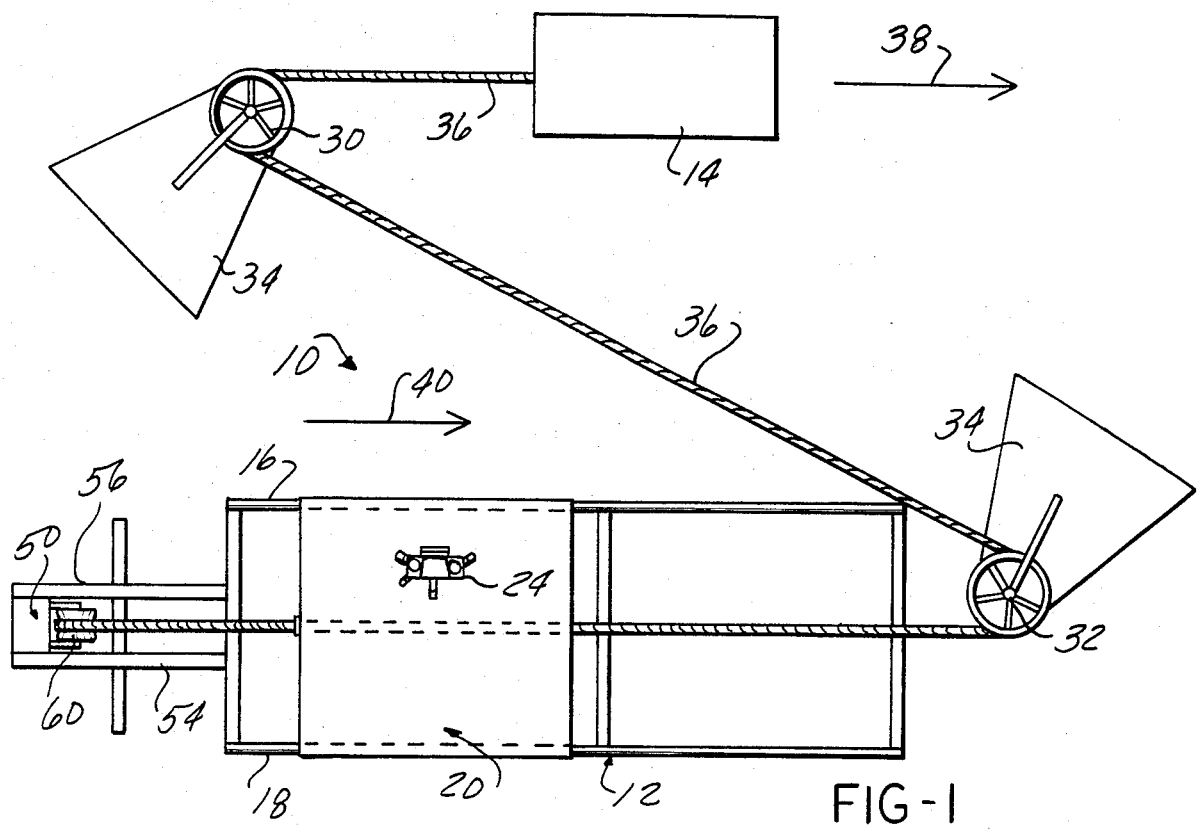
FIG. 1 is a plan view of the camera movement synchronizing apparatus of the present invention.

Throughout the following description and drawing, an identical reference number is used to refer to the same component shown in multiple figures of the drawing.

As shown in general in FIG. 1 of the drawing, the present invention comprises an apparatus 10 for synchronizing the movement of a camera with the movement of an object 14 to be photographed.

Figure 2:
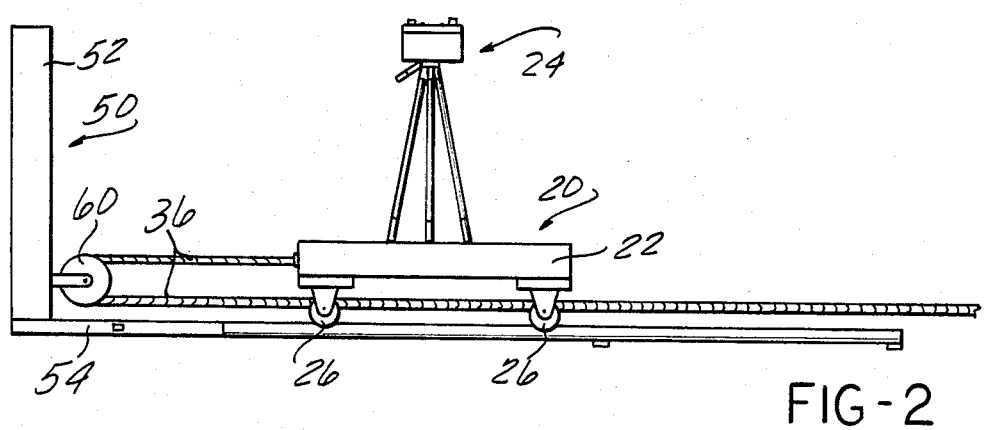
FIG. 2 is an elevational view of the camera movement synchronizing apparatus shown in FIG. 1.
Figure 3:
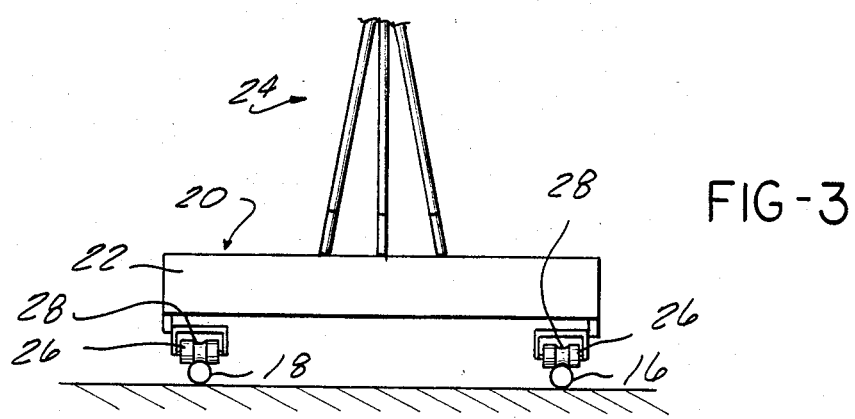
FIG. 3 is an end view of the camera movement synchronizing apparatus.

As shown in FIGS. 1, 2 and 3, the camera movement synchronizing apparatus 10 includes a horizontally disposed guide track 12. The guide track 12 is disposed parallel to the path of movement of the object 14. Preferably, the guide track 12 includes a pair of spaced, parallel guide rails 16 and 18, each of which has a tubular rod-like form or an inverted V-shape (not shown).

In a preferred embodiment, each of the guide rails 16 and 18 is covered with a thin coating of polyethylene or other friction reducing plastics. The polyethylene coating provides a low friction surface which allows smooth, unimpeded movement of the camera along the guide rails 16 and 18 as will be described in greater detail hereafter.

The camera movement synchronizing apparatus 10 also includes means 20 for movably mounting a camera on the guide track 12. The camera mounting means 20 is in the form of a dolly or platform 22 which defines a flat mounting surface for a camera 24. Wheels 26 are mounted at each of the corners of the dolly 22. The wheels 26 preferably have a central arcuate recess 28 which corresponds to the shape of the tubular guide rails 16 and 18 so as to ride smoothly therealong.

First and second pulley means 30 and 32, respectively, are also provided in the camera movement synchronizing apparatus 10. Each of the first and second pulleys 30 and 32 is in the form of a rotatable wheel which is mounted on a plate 34. The first pulley 30 is positioned in line with the path of movement of the object 14 as shown in FIG. 1. The second pulley 32 is mounted in line with the path of movement of the camera 24 along the guide rails 16 and 18.

It should be noted that more than two pulleys may be employed, depending on the terrain, camera angle, etc. where the photograph is to be shot.

An interconnecting means 36 is connected to the object 14 at one end and to the camera mounting means 20 at another end. The interconnecting means 36, which is preferably in the form of an elongated cable or rope, passes around the first and second pulleys 30 and 32. In this manner, movement of the object 14 in the direction of arrow 38 will cause a simultaneous and identical movement of the camera mounting means 20 along the guide rails 16 and 18 in the same direction as the movement of the object 14, as shown by arrow 40. Thus, the camera 24 movement is identically synchronized with the movement of the object 14 since both the camera 24 and the object 14 are moving in the same direction and at the same rate of speed.

In a more preferred embodiment of the present invention, counterweight means 50 are provided to smooth out the movement of the camera mounting means 20 along the guide rails 16 and 18. As shown more clearly in FIG. 2, the counterweight means 50 is in the form of an elongated post 52 which is mounted between a pair of spaced base members 54 and 56 which are connected to a cross member 58 extending between and connected to one end of the guide rails 16 and 18. A pulley 60 is rotatably mounted on the post 52 and receives the interconnecting means 36 therearound. As shown in FIG. 2, the interconnecting means or cable 36 passes underneath the camera mounting platform 20, around the pulley 60 and is connected at one end to the camera mounting means 20. The counterweight means 50, which includes a counterweight 51, provides a stabilizing force which prevents jerking of the cable 36 and the camera mounting means 20 when the object 14 initially begins to move.

In operation, the camera mounting means 20 will be aligned approximately opposite from the object 14. When the object 14 is moved in the direction of arrow 38, the camera movement synchronizing apparatus 10 of the present invention will cause an identical movement of the camera 24 mounted on the camera mounting means 20 at the same rate of speed and in the same direction as the object 14. The camera 24 is thereby synchronized with movement of the object 14 so as to enable high quality still photographs to be easily obtained.

Figure 4:
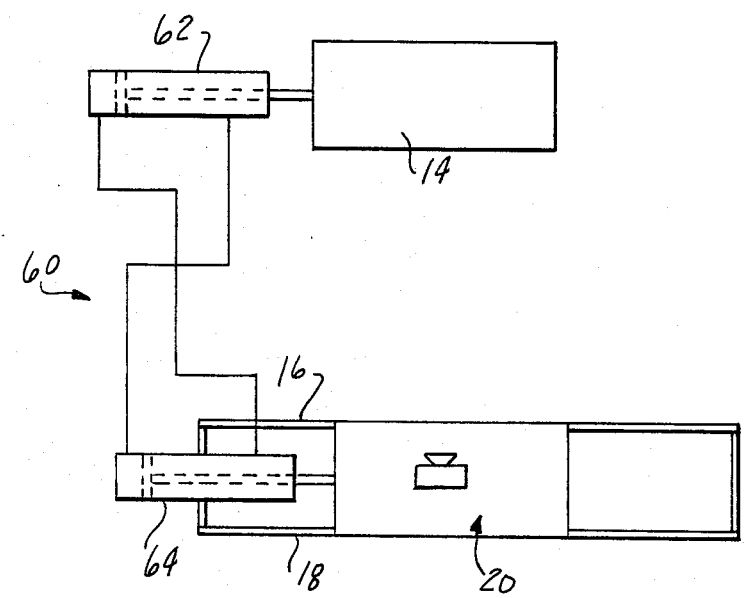
FIG. 4 is a plan view of another embodiment of the camera synchronizing apparatus of the present invention.

As shown in FIG. 4 of the drawing, it is to be understood that in practicing the present invention it is further contemplated that fluid actuated means be employed in lieu of the mechanical members. Hence, a hydraulic system 60, such as a cylinder and piston disposed at each end of a hydraulic line can replace the mechanical cable and pulley assembly. Thus, one piston-cylinder arrangement 62 would be mounted on the vehicle 14 and another piston-cylinder arrangement 64 would be mounted on or connected to the dolly 20 and interconnected in fluid flow communication for movement in identical directions.

What is claimed is:

1. An apparatus for synchronizing movement of a camera with movement of an object to be photographed to be comprising:
    a horizontal track disposed parallel to the path of movement of the object;
    means for movably mounting a camera on the track; and
    pressure energy transfering means, connected between the object and the camera mounting means and responsive to displacement of the object, for transfering a flow of fluid pressure upon displacement of the object to cause a direct linear displacement of the camera mounting means.

2. The apparatus of the claim 1 wherein the pressure energy transfering means comprises:
    first and second fluid-operated cylinder means, each having a movable piston with a rod mounted thereon, one end of each rod of the first and second cylinder means being extensible and retractable within the first and second cylinder means;
    one end of the rod of the first cylinder means being connectable to the object;
    one end of the rod of the second cylinder means being connected to the means for movably mounting the camera on the track; and
    means for connecting the first and second cylinder means in fluid flow communication such that displacement of the piston and rod of the first cylinder means upon movement of the object causes movement of the piston and rod of the second cylinder means resulting in a direct linear translation of the camera mounting means.

* * * * *